US012618691B2

(12) United States Patent
Deak et al.

(10) Patent No.: US 12,618,691 B2
(45) Date of Patent: May 5, 2026

(54) MAGNETORESISTIVE SENSOR WITH HARMONICALLY BROADENED LINEAR RANGE

(71) Applicant: MultiDimension Technology Co., Ltd., Zhangjiagang (CN)

(72) Inventors: James Geza Deak, Zhangjiagang (CN); Zhimin Zhou, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 807 days.

(21) Appl. No.: 17/758,551

(22) PCT Filed: Jan. 6, 2021

(86) PCT No.: PCT/CN2021/070518
§ 371 (c)(1),
(2) Date: Feb. 9, 2023

(87) PCT Pub. No.: WO2021/139695
PCT Pub. Date: Jul. 15, 2021

(65) Prior Publication Data
US 2025/0327690 A1 Oct. 23, 2025

(30) Foreign Application Priority Data
Jan. 10, 2020 (CN) .......................... 202010028130.1

(51) Int. Cl.
*G01D 5/16* (2006.01)
(52) U.S. Cl.
CPC ...................................... *G01D 5/16* (2013.01)
(58) Field of Classification Search
CPC ........ G01D 5/16; G01D 5/165; G01D 5/1655; G01D 5/14; G01D 1/00; G01D 5/12;
(Continued)

(56) References Cited

U.S. PATENT DOCUMENTS 7,394,247 B1 7/2008 Guo et al.
8,395,382 B2 3/2013 Phan Le et al.
(Continued)

FOREIGN PATENT DOCUMENTS

CN 101076737 A 11/2007
CN 102565727 A 7/2012
(Continued)

OTHER PUBLICATIONS

"International Application No. PCT/CN2021/070518, International Search Report and Written Opinion dated Apr. 12, 2021", (Apr. 12, 2021), 12 pgs.

*Primary Examiner* — Alvaro E Fortich
(74) *Attorney, Agent, or Firm* — Schwegman Lundberg & Woessner, P.A.

(57) ABSTRACT

A magnetoresistive sensor with harmonically broadened linear range comprises a substrate (100) and a multiple push-pull magnetoresistive sensing bridge arms. The push arms (91) of the sensing bridge comprise N types of push magnetoresistive sensing units (94). The pull arms (92) comprise N types of pull magnetoresistive sensing units. Key characteristic parameters of each magnetoresistive sensing unit comprise $R_{0i}$, $MR_i$, $H_{si}$, $\pm\alpha_{pi}$ and $a_i$. The Key characteristic parameters of the push magnetoresistive sensing units (94) and corresponding pull magnetoresistive sensing units are different from the key characteristic parameters of standard magnetoresistive sensing unit of a standard push-pull linear magnetoresistive sensor. There is at least one set of key characteristic parameters [($R_{0j}$, $MR_j$, $H_{sj}$, $\pm\alpha_{pj}$), $a_j$]. Linear parts and nonlinear harmonic parts of R-H characteristic parameters that characterize the push magnetoresistive sensing units and the pull magnetoresistive sensing units are superimposed, so that the linear range of the multiple push-push magnetoresistive sensing bridge is (Continued)

greater than the linear range of the standard push-pull linear magnetoresistive sensor.

9 Claims, 10 Drawing Sheets

(58) Field of Classification Search
CPC ........ G01D 1/18; G01R 33/093; G01R 33/09; G01R 33/091; G01R 33/095; G01R 33/096; G01R 33/098; G01R 35/00
See application file for complete search history.

(56) References Cited

U.S. PATENT DOCUMENTS

| | | | |
|---|---|---|---|
| 9,234,948 B2 * | 1/2016 | Deak .................... | G01R 33/093 |
| 9,664,754 B2 * | 5/2017 | Jin ......................... | G01R 33/09 |
| 2009/0302837 A1 | 12/2009 | Phan Le et al. | |
| 2015/0091560 A1 | 4/2015 | Deak et al. | |
| 2016/0320462 A1 | 11/2016 | Mather et al. | |
| 2017/0268864 A1 * | 9/2017 | Deak ........................ | G01D 5/14 |
| 2020/0142009 A1 * | 5/2020 | Deak .................. | G01R 33/0029 |
| 2020/0217908 A1 * | 7/2020 | Deak .................. | G01R 33/0011 |

FOREIGN PATENT DOCUMENTS

| | | | |
|---|---|---|---|
| CN | 202939205 U | 5/2013 | |
| CN | 206583459 U | 10/2017 | |
| CN | 108919147 A | 11/2018 | |
| CN | 109633496 A | 4/2019 | |
| CN | 111198342 A | 5/2020 | |
| WO | WO-2021139695 A1 | 7/2021 | |

* cited by examiner $$\alpha p \neq 90°$$
$$\Delta \alpha = \alpha p - \alpha f$$

$$\alpha p \neq -90°$$
$$\Delta \alpha = \alpha p + \alpha f$$

Vcc

90

91

95 93

94

Hext

V+

V−

92

91

92

MAGNETORESISTIVE SENSOR WITH HARMONICALLY BROADENED LINEAR RANGE

PRIORITY CLAIM TO RELATED APPLICATIONS

This application is a U.S. national stage filing under 35 U.S.C. § 371 from International Application No. PCT/CN2021/070518, filed on 6 Jan. 2021, which claims priority to Chinese Application No. 202010028130.1, filed on 10 Jan. 2020. This application incorporates by reference the entirety of International Application No. PCT/CN2021/070518 and its published version WO2021/139695 (published 15 Jul. 2021).

TECHNICAL FIELD

Embodiments of the present disclosure relate to magnetic sensor technology, and in particular, relates to a magnetoresistive sensor with harmonically broadened linear range.

BACKGROUND

A magnetoresistive sensing unit includes a free layer, a pinned layer, and an intermediate insulating layer. In practical use, a push-pull linear tunneling magnetoresistive sensor includes push magnetoresistive sensing units and pull magnetoresistive sensing units, and the angle difference, anglePL-angleFL, between free layer magnetic moment and pinned layer magnetic moment of the sensing units respectively are between 90° and −90°, wherein anglePL is a direction angle $\alpha_p$ of the pinned layer magnetic moment, and angleFL is a direction angle $\alpha_f$ of the free layer magnetic moment.

The relationship between the resistance R of the push-pull linear tunneling magnetoresistive sensor and an external magnetic field H can be described by a zero magnetic field resistance R0, a magnetoresistance change rate MR, and a free layer saturation magnetic field Hs of the magnetoresistive sensing unit, which is symmetrical in a linear range [−HL, HL].

The linear range of the existing push-pull linear tunneling magnetoresistive sensors is narrow.

SUMMARY

The embodiments of the present disclosure provide a magnetoresistive sensor with harmonically broadened linear range, to improve the linear range of a push-pull linear tunneling magnetoresistive sensor.

The embodiments of the present disclosure provide a magnetoresistive sensor with harmonically broadened linear range, including:

a substrate; and multiple push-pull magnetoresistive sensing bridge arms positioned on the substrate, the multiple push-pull magnetoresistive sensing bridge arms including push arms and pull arms, the push arms including N types of push magnetoresistive sensing units, the pull arms including N types of pull magnetoresistive sensing units, and N being an integer greater than 1; where key characteristic parameters of each magnetoresistive sensing unit includes a zero magnetic field resistance $R0_i$, a magnetoresistance change rate $MR_i$, a free layer saturation magnetic field $H_{si}$, a direction angle $\pm\alpha_{pi}$ of pinned layer magnetic moment, and a series-parallel coefficient $a_i$, wherein the push magnetoresistive sensing unit has the direction angle $\pm\alpha_{pi}$ of the pinned layer magnetic moment, and the pull magnetoresistive sensing unit has the direction angle $-\alpha_{pi}$ of the pinned layer magnetic moment, i being an integer from 1 to N; key characteristic parameters of the push magnetoresistive sensing units and corresponding pull magnetoresistive sensing units are different from the key characteristic parameters of standard magnetoresistive sensing unit of a standard push-pull linear magnetoresistive sensor;

there is at least one set of key characteristic parameters $[(R0_j, MR_j, H_{sj}, \pm\alpha_{pj}), a_j]$, j being an integer greater than or equal to 1 and less than or equal to N. Linear parts and nonlinear harmonic parts of R-H characteristic parameters that characterize the push magnetoresistive sensing units and corresponding pull magnetoresistive sensing units are superimposed, so that the linear range of the multiple push-push magnetoresistive sensing bridge is greater than the linear range of the standard push-pull linear magnetoresistive sensor, wherein the key characteristic parameters of the standard magnetoresistive sensing unit are $[(R0_s, MR_s, H_{ss}, \pm\alpha_{ps}), a_s]$, $\pm\alpha_{ps}=90°$, $a_s=1$.

In the embodiment of the present disclosure, two or more magnetoresistive sensing units with different key characteristic parameters are arranged in the push-pull magnetoresistive sensor, and the magnetoresistive sensing units are connected in series, parallel, or a hybrid series-parallel manner to constitute a new multiple push-pull magnetoresistive sensor. The multiple push-pull magnetoresistive sensor has at least one set of key characteristic parameters $[(R0_j, MR_j, H_{sj}, \pm\alpha_{pj}), a_j]$. Linear parts and nonlinear harmonic parts of R-H characteristic parameters that characterize the push magnetoresistive sensing units and corresponding pull magnetoresistive sensing units are superimposed, so that the linear range of the multiple push-pull magnetoresistive sensing bridge arms is greater than the linear range of the standard push-pull linear magnetoresistive sensor, and thus the linear range is improved.

BRIEF DESCRIPTION OF THE DRAWINGS

In order to more clearly describe the technical solutions of the embodiments of the present disclosure and prior art, drawings required to describe the embodiments and prior art are briefly introduced. Obviously, the drawings in the following description are not all of the possible embodiments of the present disclosure, and for those of ordinary skill in the art, other drawings may also be obtained without creative labor based on these drawings.

DETAILED DESCRIPTION

Figure 1:
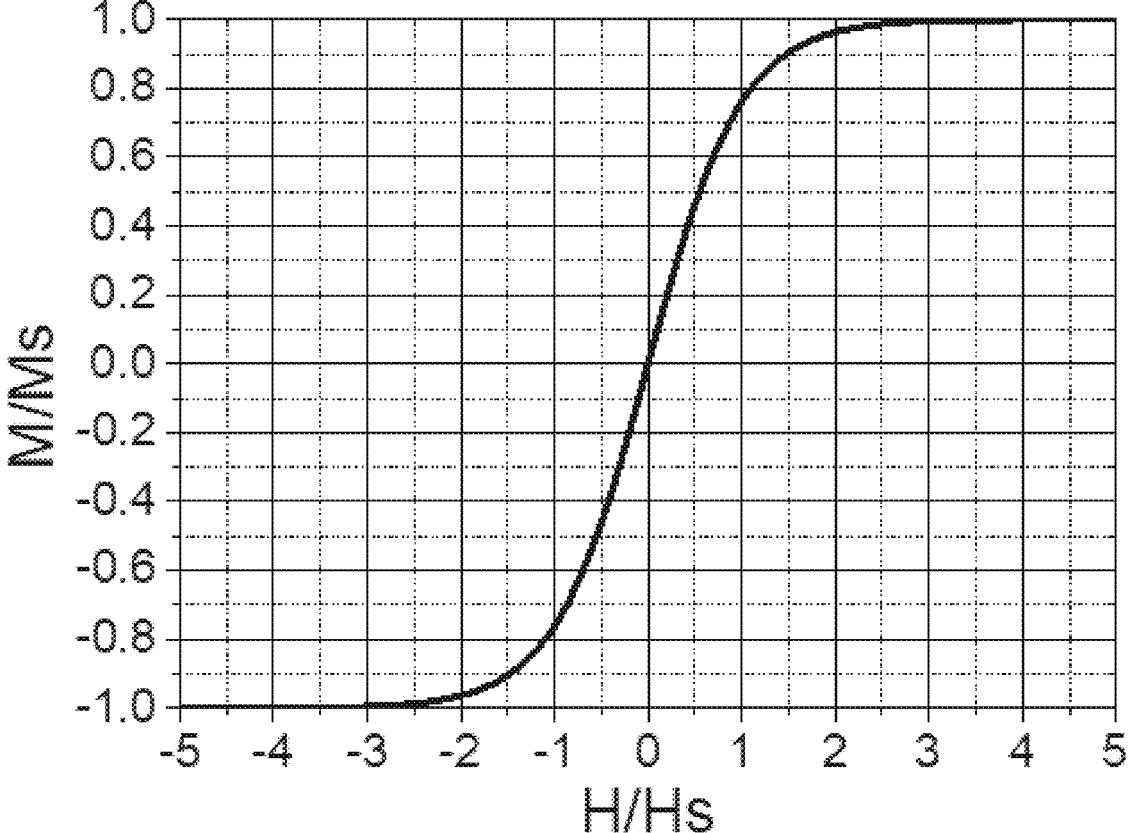
FIG. 1 is a magnetization curve diagram of single domain magnetic moment along in an external magnetic field.

In order to make yhr objectives, technical solutions, and advantages of the present disclosure more clear, the technical solutions of the present disclosure will be described in detail below through embodiments and with reference to the drawings in the embodiments of the present disclosure. Obviously, the described embodiments are only a part of, but not all, the possible embodiments of the present disclosure. Based on the embodiments of the present disclosure, all other embodiments obtained by those of ordinary skill in the art without any inventive work are within the scope of the present disclosure.

An embodiment of the present disclosure provides a magnetoresistive sensor with harmonically broadened linear range. Optionally, the magnetoresistive sensor is a push-pull linear magnetoresistive sensor based on tunneling magnetoresistance technology. The magnetoresistive sensor provided by the embodiment includes a substrate; and multiple push-pull magnetoresistive sensing bridge arms, positioned on the substrate. The multiple push-pull magnetoresistive sensing bridge arms include push arms and pull arms. The push arms include N types of push magnetoresistive sensing units, and the pull arms include N types of pull magnetoresistive sensing units, N being an integer greater than 1. Key characteristic parameters of each magnetoresistive sensing unit include a zero magnetic field resistance $R0_i$, a magnetoresistance change rate $MR_i$, a free layer saturation magnetic field $H_{si}$, a direction angle $\pm\alpha_{pi}$ of pinned layer magnetic moment, and a series-parallel coefficient $a_i$, wherein the push magnetoresistive sensing unit has the direction angle $\pm\alpha_{pi}$ of the pinned layer magnetic moment, and the pull magnetoresistive sensing unit has the direction angle $-\alpha_{pi}$ of the pinned layer magnetic moment, i being an integer from 1 to N. The key characteristic parameters of the push magnetoresistive sensing units and corresponding pull magnetoresistive sensing units are different from the key characteristic parameters of standard magnetoresistive sensing unit of a standard push-pull linear magnetoresistive sensor. There is at least one set of key characteristic parameters $[(R0_j, MR_j, H_{sj}, \pm\alpha_{pj}), a_j]$, j being an integer greater than or equal to 1 and less than or equal to N. Linear parts and nonlinear harmonic parts of R-H characteristic parameters that characterize the push magnetoresistive sensing units and the corresponding pull magnetoresistive sensing units are superimposed, so that the linear range of the multiple push-push magnetoresistive sensing bridge is greater than the linear range of the standard push-pull linear magnetoresistive sensor, wherein the key characteristic parameters of the standard magnetoresistive sensing unit are $[(R0_s, MR_s, H_{ss}, \pm\alpha_{ps}), a_s], \pm\alpha_{ps}=90°$, and $a_s=1$. The magnetoresistive sensor with harmonically broadened linear range is a push-pull linear magnetoresistive sensor, utilizing tunneling magnetoresistive technology.

In the embodiment, the push arms include N types of push magnetoresistive sensing units, and the key characteristic parameters of the i-th push magnetoresistive sensing unit are $[(R0_i, MR_i, H_{si}, \pm\alpha_{pi}), a_i]$. The pull arms include N types of pull magnetoresistive sensing units, and the key characteristic parameters of the i-th pull magnetoresistive sensing unit are $[(R0_i, MR_i, H_{si}, -\alpha_{pi}), a_i]$. The connection manners of the N types of magnetoresistive sensing units of the push arms and the pull arms are exactly the same.

The standard push-pull linear magnetoresistive sensor includes standard push magnetoresistive sensing units and standard pull magnetoresistive sensing units. The key characteristic parameters of the standard push magnetoresistive sensing units are $[(R0_s, MR_s, H_{ss}, \pm\alpha_{ps}), a_s]$, and the key characteristic parameters of the standard pull magnetoresistive sensing units are $[(R0_s, MR_s, H_{ss}, -\alpha_{ps}), a_s]$, wherein $\alpha_{ps}=90°$, $a_s=1$, and the linear range of the magnetic field is $[-HLs, HLs]$.

In the embodiment, in the magnetoresistive sensing units of the magnetoresistive sensor with harmonically broadened linear range, there are at least one push magnetoresistive sensing unit and corresponding pull magnetoresistive sensing unit, and the key characteristic parameters $[(R0_j, MR_j, H_{sj}, \pm\alpha_{pj}), a_j]$ of the magnetoresistive sensing units are different from the key characteristic parameters $[(R0_s, MR_s, H_{ss}, \pm\alpha_{ps}), a_s]$ of the standard push/pull magnetoresistive sensing units, the difference described here referring to that there is a difference in at least one of five key characteristic parameters of the push magnetoresistive sensing unit. For example, there is at least one push magnetoresistive sensing unit in the magnetoresistive sensor with harmonically broadened linear range, and the direction angle of pinned layer magnetic moment of the push magnetoresistive sensing unit is not equal to 90°, while the direction angle of the pinned layer magnetic moment of the standard push magnetoresistance sensing unit is fixed at 90°.

For the multiple push-pull TMR bridge arm linear sensors, linear parts and nonlinear harmonic parts of R-H characteristic parameters that characterize the push magnetoresistive sensing units and corresponding pull magnetoresistive sensing units are superimposed, so that the linear range of the multiple push-pull TMR bridge arm linear sensors bridge is greater than the linear range of the standard push-pull linear magnetoresistive sensor. So, the linear range of the multiple push-pull TMR bridge arm linear sensors provided by the present disclosure is $[-HL, HL]$, and the

[−HL, HL] covers the linear range [−HLs], HLs] of the standard push-pull linear magnetoresistive sensor. The multiple push-pull TMR bridge arm linear sensors provided by the present disclosure has a gain factor Q=HL/HLs, Q being a number greater than 1.

Optionally, the direction angle of the pinned layer magnetic moment of the magnetoresistive sensing unit of the multiple push-pull magnetoresistive sensing bridge arms has a value range of 0°-360°, wherein the direction angle of the pinned layer magnetic moment of the magnetoresistive sensing unit is achieved by laser annealing, and its value range is 0°-360°.

Optionally, the zero magnetic field resistance of the magnetoresistive sensing unit of the multiple push-pull magnetoresistive bridge arm sensor has a value range of 1 KΩ (Kilo Ohm)-1000 MΩ (Mega Ohm), wherein parameters of the zero magnetic field resistance are achieved by setting the area of the magnetoresistive sensing unit, and its value range is 1 KΩ-1000 MΩ.

Optionally, the free layer saturation magnetic field of the magnetoresistive sensing unit of the multiple push-pull magnetoresistive bridge arm sensor has a value range of 1-100 Oe (Oersted), wherein parameters of the free layer saturation Optionally, the ratio of the linear range of multiple push-pull magnetoresistive bridge arm sensor relative to the linear range of the standard push-pull linear magnetoresistive sensor is greater than 1 and less than or equal to 2, that is, the multiple push-pull magnetoresistive bridge arm linear TMR sensor has a gain factor Q-HL/HLs, Q being greater than 1 and less than or equal to 2, wherein the ratio Q of the linear range HL of the multiple push-pull magnetoresistive bridge arm sensor to the linear range of the standard push-pull linear magnetoresistive sensor is greater than 1 and less than or equal to 2.

The sensitivity of the multiple push-pull arm TMR linear magnetoresistive sensor is S=V/Vcc, Vcc being a power supply voltage signal, V being an output voltage signal, S vs H characterizing a linear relationship between S and an external magnetic field H within the linear magnetic field interval [−HL, HL], and that in the magnetic field interval H>HL or H<−HL, the relationship between S and the external magnetic field H is nonlinear, specifically a second harmonic or higher harmonic nonlinear relationship including the external magnetic field H. Obviously, the linear range of the multiple push-pull arm TMR linear magnetoresistive sensor will be enhanced if second harmonic items or higher harmonic items in the nonlinear interval can be compensated.

In the multiple push-pull bridge arm TMR linear magnetoresistive sensor, magnetoresistance R vs H characteristic parameters of the magnetoresistive sensing unit have good linearity at anglePL-angleFL=90° and −90°, and nonlinear items thereof such as the harmonic terms or the higher harmonic terms will show different R vs H nonlinear characteristics according to different angle values at other angles such as 0° or 180°. In the present disclosure, through parallel or series connection between the magnetoresistive sensing units having different linear or nonlinear items, compensation between the nonlinear items can be achieved, so that the linear parts and nonlinear harmonic parts of magnetoresistance R-external magnetic field H characteristic parameters that characterize the N types of push magnetoresistive sensing units and pull magnetoresistive sensing units are superimposed, the linear range HL of the multiple push-push TMR linear magnetoresistive sensor is improved relative to the linear range HLs of the standard push-pull TMR linear magnetoresistive sensor, and thus the push-pull TMR linear magnetoresistive sensor with the higher linear range is obtained.

The specific process is as follows.

Referring to FIG. 1, a diagram of a coordinate relationship between the free layer magnetic moment of the magnetoresistive sensing unit and the external magnetic field is shown, wherein the vertical coordinate M/Ms is the free layer magnetic moment, and the horizontal coordinate H/Hs is the external magnetic field applied to the magnetoresistive sensing unit. In a single domain magnetoresistance sensing unit, a relational expression M(H) between the magnetic moment M and the external magnetic field H is expressed as follows:

$$M=Ms \cdot \tan h(H/Hs) \qquad (1)$$

Combining FIG. 1 and equation (1), it can be seen that within a range where the external magnetic field H/Hs is close to 0, such as an interval [−1, +1], the free layer magnetic moment M/Ms and the external magnetic field H/Hs can be regarded as a linear relationship; within a range where the external magnetic field H/Hs is close to 1, such as an interval [+1, +3] or [−3, −1], the free layer magnetic moment M/Ms and the external magnetic field H/Hs are nonlinear transition parts; and within a greater range of the external magnetic field H/Hs, such as an interval [−5, −3] or [+3, +5], the free layer magnetic moment M/Ms can be approximately 1.

Figure 2:
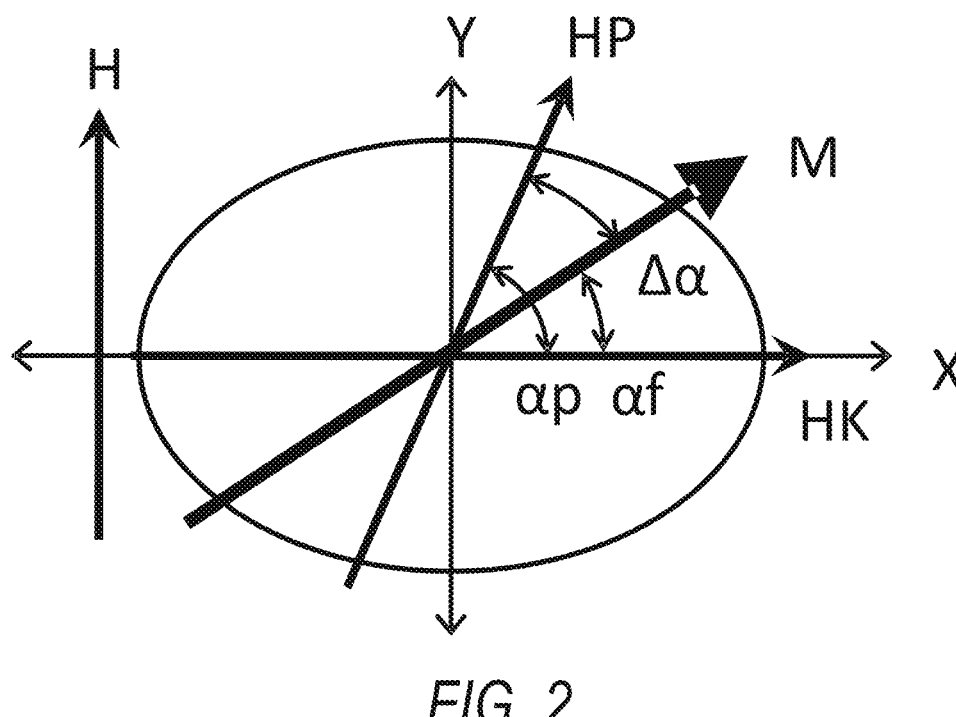
FIG. 2 is an orientation diagram of magnetic moment of a magnetoresistive sensing unit relative to an external magnetic field.

Referring to FIG. 2, a diagram of an orientation relationship between the magnetic moment M of the magnetoresistive sensing unit and the external magnetic field H is shown, wherein X direction characterizes a magnetization direction of the free layer at the zero magnetic field, and Y direction represents the direction of the external magnetic field H. The resistance R of the magnetoresistive sensing unit is expressed as follows:

$$R = R_0 + R_0 \cdot \frac{MR}{100} \cdot 0.5 \cdot \left(1 + \text{COS}\left((\alpha_f - \alpha_p) \cdot \frac{\pi}{180}\right)\right) \qquad (2)$$

wherein $\alpha_f$ is a direction angle of free layer magnetic moment of the magnetoresistive sensing unit relative to an X axis under the action of the external magnetic field H, $\alpha_p$ is the direction angle of pinned layer magnetic moment of the magnetoresistive sensing unit relative to the X axis, $\alpha_f$-$\alpha_p$ is an included angle between the free layer magnetic moment and the pinned layer magnetic moment, R0 is a resistance value of the magnetoresistive sensing unit at the minimum magnetic field (zero magnetic field), namely, the resistance value when $\alpha_f$-$\alpha_p$=180°, MR is a impedance change rate of the magnetoresistance sensing unit, namely, a magnetoresistance change rate, the direction angle $\alpha_p$ of the pinned layer magnetic moment is fixed, and the direction angle $\alpha_f$ of the free layer magnetic moment changes along with the external magnetic field H.

Figure 3:
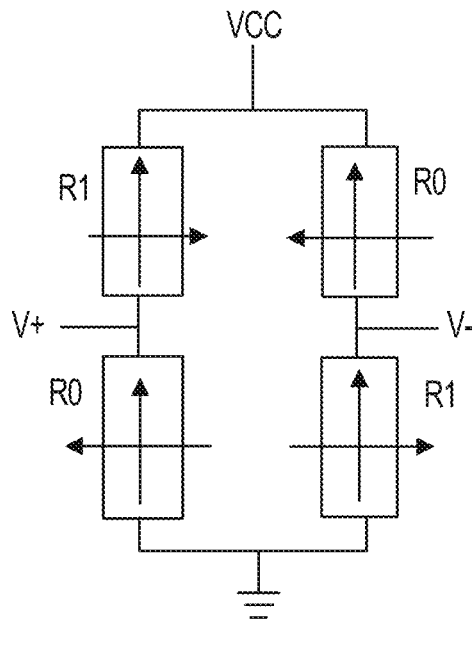
FIG. 3 is an electrical connection diagram of a push-pull magnetoresistive sensor.

Referring to FIG. 3, a structural diagram of the push-pull magnetoresistive sensor is shown. For the magnetoresistive sensor with a push-pull full-bridge structure, the resistance of the push arms is $R_{push}$ and the resistance of the pull arms is $R_{pull}$, then the signal sensitivity S=V/Vcc corresponding to a signal voltage V at an output end and a voltage Vcc at both ends of a power supply can be converted to:

$$S = \frac{(R_{push} - R_{pull})}{(R_{push} + R_{pull})} \qquad (3)$$

Under the action of the external magnetic field H, the free layer can normalize the magnetic field H to be x and normalize the magnetic moment M to be Mx. It is known that the direction angle of the free layer magnetic moment of the magnetoresistive sensing unit relative to the X axis under the action of the external magnetic field H is $\alpha_f$, so that the normalized magnetic field H and the normalized magnetic moment M are expressed as follows:

$$x = \frac{H}{H_s} \tag{4}$$

$$M_x = \frac{M}{M_S} \tag{5}$$

Combining EXPRESSIONS (1), (4) and (5), it can be obtained that $$M_x = \tan h(x) \tag{1-1}$$

Through substituting and calculating, the direction angle $\alpha_f$ of the free layer magnetic moment is obtained as follows:

$$\alpha_f = a\sin(M_x) \cdot \frac{180}{\pi} = a\sin(\tanh(x)) \cdot \frac{180}{\pi} = a\sin\left(\tanh\left(\frac{H}{H_s}\right)\right) \cdot \frac{180}{\pi} \tag{6}$$

Figure 4A:
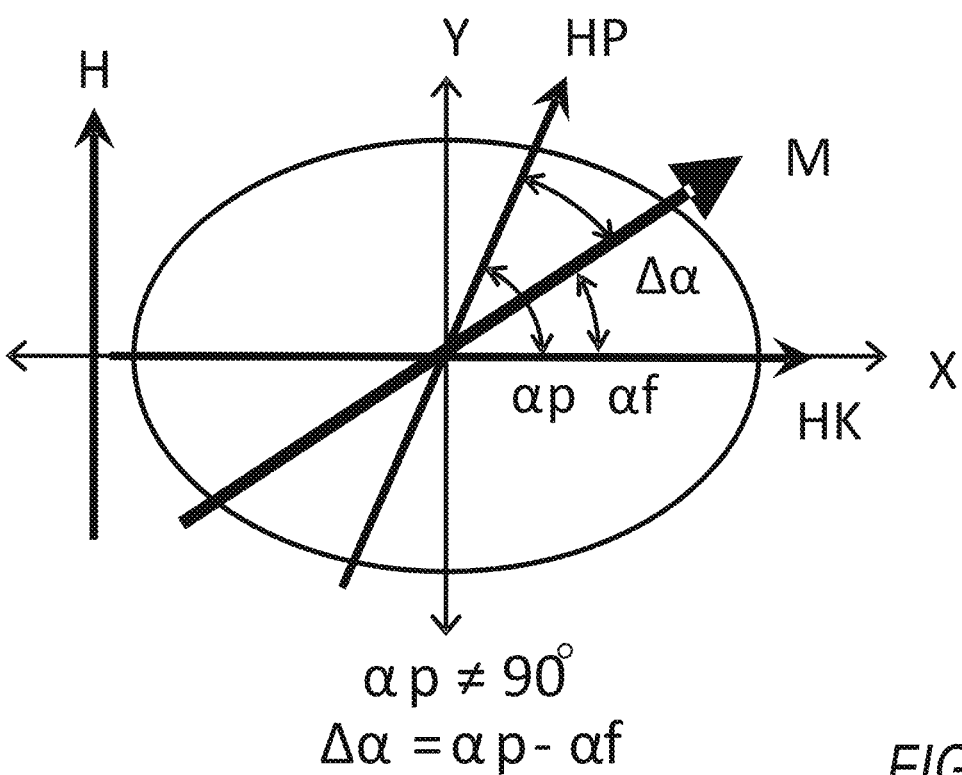
FIG. 4a is an orientation diagram of magnetic moment of a push magnetoresistive sensing unit.
Figure 4B:
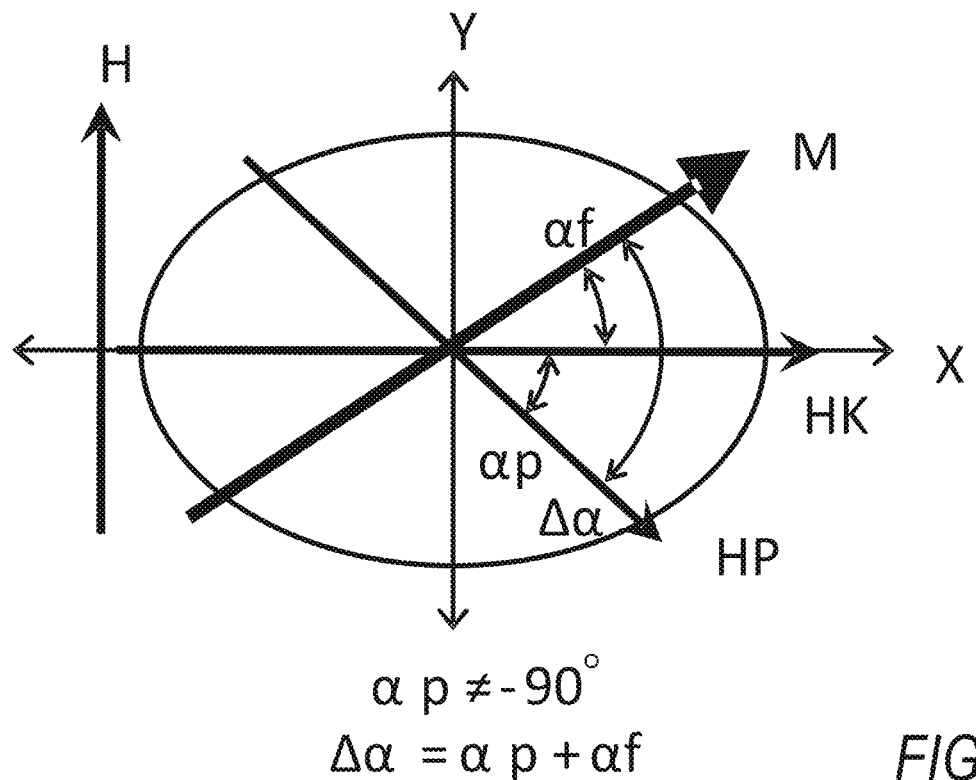
FIG. 4b is an orientation diagram of magnetic moment of a pull magnetoresistive sensing unit.

Referring to FIG. 4a, which shows a schematic diagram of the orientation of magnetic moment corresponding to the push magnetoresistive sensing unit and the orientation of the magnetic field, and referring to FIG. 4b, which shows a schematic diagram of the orientation of magnetic moment corresponding to the pull magnetoresistive sensing unit and the orientation of the magnetic field, the direction angle of the pinned layer of the push magnetoresistive sensing unit is $\alpha_{pi}$, and the direction angle of the pinned layer of the pull magnetoresistive sensing unit is $-\alpha_{pi}$. The direction angle of the pinned layer of the magnetoresistive sensing unit is fixed, specifically, the direction angle of the pinned layer of the push magnetoresistive sensing unit is different from that of the pinned layer of the pull magnetoresistive sensing unit, but the absolute values of the two direction angles are the same.

Figure 5:
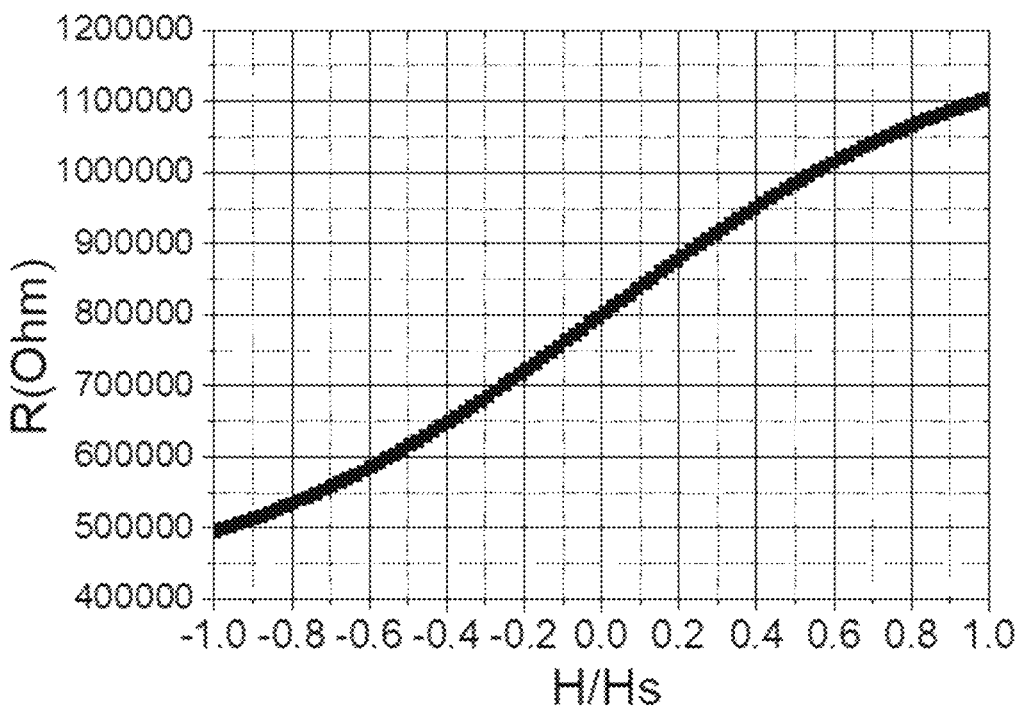
FIG. 5 is a characteristic curve diagram of a standard push-pull TMR linear magnetoresistive sensor.

In the normal standard push-pull TMR linear magnetoresistive sensor, the direction angle of the pinned layer of the standard push magnetoresistive sensing unit is 90°, and the direction angle of the pinned layer of the standard pull magnetoresistive sensing unit is −90°. Although the free layer saturation magnetic fields Hss of the standard push magnetoresistive sensing unit and the standard pull magnetoresistive sensing unit can take different values, a resistance RvsH/Hs characteristic curve of the standard push magnetoresistive sensing unit and a resistance RvsH/Hs characteristic curve of the standard pull magnetoresistive sensing unit are the same curve shown in FIG. 5. It can be seen that in the push-pull TMR linear magnetoresistive sensor, the free layer saturation magnetic field Hs of the magnetoresistive sensing unit does not affect the RvsH/Hs characteristic curve, and the direction angle of the pinned layer of the magnetoresistive sensing unit may affect the RvsH/Hs characteristic curve.

Figure 6:
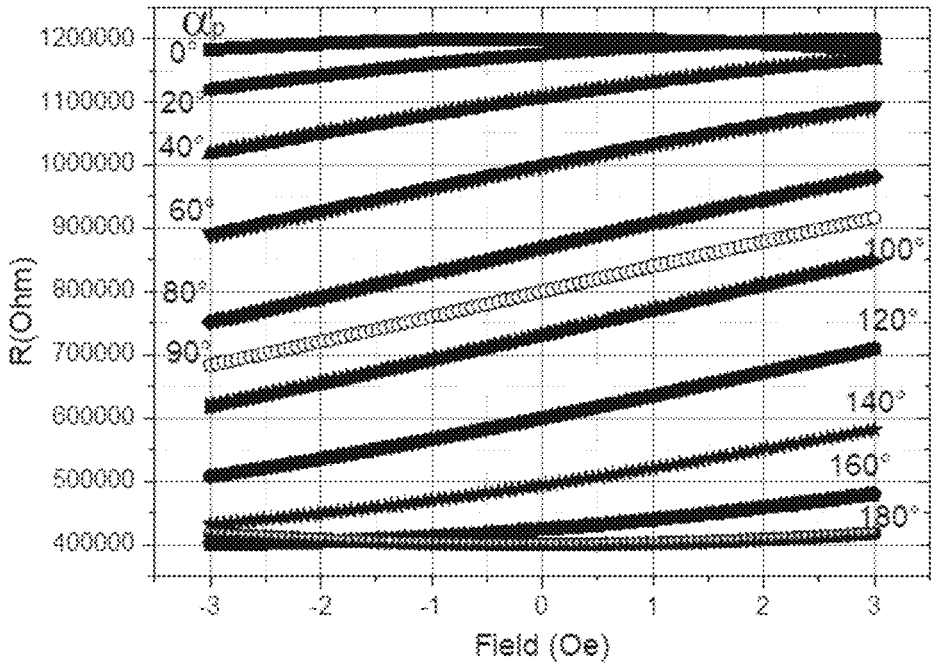
FIG. 6 is a relationship diagram of a magnetoresistive sensing unit changing along with a direction angle of a pinned layer.

Referring to FIG. 6, RvsH/Hs characteristic curves corresponding to different pinned layer direction angles are shown. It can be seen that when the direction angle of the pinned layer of the magnetoresistive sensing unit is 90°, the magnetoresistive sensing unit has the highest linearity and the largest linear interval. Therefore, for a single push-pull linear magnetoresistive sensor based on tunneling magnetoresistive technology, when the zero magnetic field resistance R0, the magnetoresistance change rate MR, and the free layer saturation magnetic field Hs are determined, the linear range [−HL, HL] of the magnetoresistive sensor is constant. For example, [−HL, HL] is [−3, 3].

It can also be seen from FIG. 6 that when the direction angle of the pinned layer of the magnetoresistive sensing unit is not 90°, such as 0°, 10°, 20°, . . . , 180°, the RvsH/Hs characteristic curve of the magnetoresistive sensing unit has a nonlinear stage within the interval [−HL, HL], and the more the direction angle of the pinned layer deviates from 90°, the more the ratio of the nonlinear stage to a linear stage of the RvsH/Hs characteristic curve within the interval [−HL, HL] gradually increases.

In conclusion, two or more magnetoresistive sensing units with different key characteristic parameters are arranged in the push-pull TMR linear magnetoresistive sensor, and the magnetoresistive sensing units are connected in series, parallel or a hybrid series-parallel manner to constitute a new push-pull TMR linear magnetoresistive sensor, which can compensate the nonlinear part of the RvsH characteristic parameters of each magnetoresistance sensing unit, and finally greatly improves the linear range HL defined by the sensitivity SvsH relative to the linear range HLs of the standard push-pull linear magnetoresistive sensor, wherein the different key characteristic parameters include at least one of different pinned layer direction angles, different free layer saturation magnetic fields Hs, and different zero magnetic field resistances R0.

Figures 7, 8:
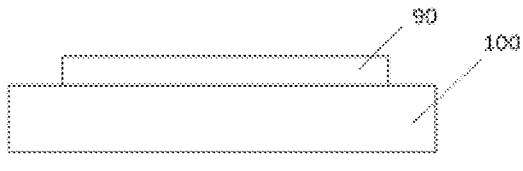
FIG. 7 is a cross-sectional view of a multiple push-pull magnetoresistive sensor.
FIG. 8 is an electrical connection diagram of a multiple push-pull magnetoresistive sensor.

Referring to FIG. 7, a cross-sectional view of the harmonic width enhanced TMR sensor provided by the embodiment of the present disclosure is shown. The multiple push-pull magnetoresistive sensor includes: a substrate 100 and a push-pull magnetoresistive sensor 90 positioned on the substrate 100.

Referring to FIG. 8, an electrical connection diagram of the multiple push-pull magnetoresistive sensor in FIG. 7 is shown. The multiple push-pull magnetoresistive sensor includes push arms 91 and pull arms 92. The push arms 91 include N types of push magnetoresistive sensing units 94, and the key characteristic parameters of the i-th push magnetoresistive sensing unit 94 are [(R0$_i$, MR$_i$, H$_{si}$, ±$\alpha_{pi}$), a$_i$]. The pull arms 92 include N types of pull magnetoresistive sensing units, and the key characteristic parameters of the i-th pull magnetoresistive sensing unit are [(R0$_i$, MR$_i$, H$_{si}$, −$\alpha_{pi}$), a$_i$]. A series-parallel connection relationship 93 of the magnetoresistive sensing units is characterized by a series-parallel coefficient a$_i$. The orientation of the pinned layer magnetic moment of the magnetoresistive sensing unit is marked by 95. The connection manners of the N types of magnetoresistive sensing units of the push arms 91 and the pull arms 92 are exactly the same. The N types of magnetoresistive sensing units can be connected in series, parallel, or a hybrid series-parallel manner, to form the push arms and the pull arms.

For any standard push-pull linear magnetoresistive sensor, the key characteristic parameters of the push magnetoresistive sensing unit are [(R$_s$, MR$_s$, H$_{ss}$, ±$\alpha_{ps}$−90°), a$_s$], the key characteristic parameters of the pull magnetoresistive sensing unit are [(R$_s$, MR$_s$, H$_{ss}$, −$\alpha_{ps}$=−90°), a$_s$], and the linear range is [−HLs, HLs].

In the multiple push-pull magnetoresistive sensor shown in FIG. 8, there are at least one set of the push magnetoresistive sensing unit and corresponding pull magnetoresistive sensing unit, the key characteristic parameters of the magnetoresistive sensing units being different from those of the standard push-pull linear magnetoresistive sensor, so that the multiple push-pull magnetoresistive sensor provided by the embodiment has a linear range [−HL, HL] higher than the standard push-pull linear magnetoresistive sensor, and has a gain factor Q=HL/HLs, Q being a number greater than 1.

Table 1 lists curve values of the key characteristic parameters Hs, &p, sensitivity S=V/Vcc and sensitivity difference S-Ss of the standard push-pull linear magnetoresistive sensor and the N=2 multiple push-pull magnetoresistive sensor shown in FIG. 8 changing along with the external magnetic field H, wherein the N types of magnetoresistive sensing units of the push arms and the pull arms of the N=2 multiple push-pull magnetoresistive sensor are all connected in parallel. The unit of each parameter in Table 1 is not shown.

A SvsH curve is fit on this basis, and HLs is calculated by setting a threshold:

$$|S_a - S| < 0.1 \cdot S \qquad (13)$$

A calculation result shows that HLs is approximately equal to 8.5, namely, the linear range is [−8.5, +8.5] Oe.

B, the N=2 multiple push-pull magnetoresistive sensor:

Supposing that an N push-pull magnetoresistive sensor includes N types of magnetoresistive sensing units, the key characteristic parameters of the push magnetoresistive sensing units of the N push-pull magnetoresistive sensor are [(R0$_i$, MR$_i$=200, H$_{si}$, ±$\alpha_{pi}$), a$_i$=1], the key characteristic parameters of the pull magnetoresistive sensing units of the N push-pull magnetoresistive sensor are [(R0$_i$, MR$_i$=200, H$_{si}$, −$\alpha_{pi}$), a$_i$=1], i=1, . . . , N.

| | | push | | pull | | Linear range | MR |
|---|---|---|---|---|---|---|---|
| standard | ±$\alpha_{ps}$ | 90 | | −90 | | (−8.5, +8.5) | 200 |
| | Hss | 10 | | 10 | | | |

| | | push1 | push2 | pull 1 | pull2 | | |
|---|---|---|---|---|---|---|---|
| parallel | ±$\alpha_{pi}$ | 116.2 | 115.4 | −116.2 | −115.4 | (−10.4, +10.4) | 200 |
| | Hsi | 15.30 | 9.61 | 15.30 | 9.61 | | |
| | ai | 0.9824 | 0.0176 | 0.9824 | 0.0176 | | |

A, the standard push-pull linear magnetoresistive sensor:

As shown in Table 1, in the standard push-pull linear magnetoresistive sensor, the key characteristic parameters of the standard magnetoresistive sensing unit are [(R0$_s$, MR$_s$, H$_{ss}$, ±$\alpha_{ps}$), a$_s$], wherein the key characteristic parameters of the standard push magnetoresistive sensing unit are selected to be [(500*e3, 200, 10 Oe, 90°), 1], and the key characteristic parameters of the standard pull magnetoresistive sensing unit are selected to be [(500*e3, 200, 100 e, −90°), 1], to serve as reference objects, the expressions of the resistance R$_{pushs}$ of the push arms and the resistance R$_{pulls}$ of the pull arms are expressed as follows:

$$R_{pushs}=R(500e3, 200, 90°, 10, 1) \qquad (7)$$

$$R_{pull}S=R(500e3, 200, −90°, 10, 1) \qquad (8)$$

The resistance R$_{pushs}$ of the push arms and the resistance R$_{pulls}$ of the pull arms under the action of the external magnetic field H can be expressed as:

$$R_{pushs}(H) = R_{0s} + R_{0r} \cdot \frac{MRs}{100} \cdot 0.5 \cdot \left(1 + \cos\left((\alpha_{cs}(100e, H) - 90°) \cdot \frac{\pi}{180}\right)\right) \qquad (9)$$

$$R_{pulls}(H) = R_{0s} + R_{0r} \cdot \frac{MRs}{100} \cdot 0.5 \cdot \left(1 + \cos\left((\alpha_{cs}(100e, H) - 90°) \cdot \frac{\pi}{180}\right)\right) \qquad (10)$$

wherein $\alpha_{fs}$ is the direction angle of the free layer magnetic moment of the standard magnetoresistive sensing unit.

The sensitivity of the standard push-pull linear magnetoresistive sensor can be expressed as:

$$S_k = \frac{R_{pushs} - R_{pulls}}{R_{pushs} + R_{pulls}} \qquad (11)$$

The value of H can be in a wider range such as [−16 Oe, 16 Oe], 100 data points H$_k$ are selected, k=1~100, and the following linear function is used:

$$S=a \cdot H \qquad (12)$$

B1, when the N types of magnetoresistive sensing units are connected in series, the resistance R$_{push}$ of the push arms and the resistance R$_{pull}$ of the pull arms can be expressed as:

$$R_{push} = \sum_{i=1}^{N} a_i \cdot R(R0_i, MR_i, H_{si}, +\alpha_{pi}) \qquad (15)$$

$$R_{pull} = \sum_{i=1}^{N} a_i \cdot R(R0_i, MR_i, H_{si}, -\alpha_{pi}) \qquad (16)$$

B2, when the N types of magnetoresistive sensing units are connected in a series-parallel manner, the resistance R$_{push}$ of the push arms and the resistance R$_{pull}$ of the pull arms can be expressed as:

$$R_{push} = \sum_{i=1}^{N} a_i \cdot R(+\alpha_{pi}, H_{si}) + \frac{1}{\sum_{i=1}^{N} \frac{b_i}{R(+\alpha_{pi}, H_{si})}} \qquad (17)$$

$$R_{pull} = \sum_{i=1}^{N} a_i \cdot R(-\alpha_{pi}, H_{si}) + \frac{1}{\sum_{i=1}^{N} \frac{b_i}{R(-\alpha_{pi}, H_{si})}} \qquad (18)$$

In addition, bridge arm resistance R is not only a function of the direction angle of the pinned layer magnetic moment and the saturation magnetic field of the free layer of the magnetoresistive sensing unit, but also a function of the magnetoresistance change rate and the zero magnetic field resistance R0, namely, $$R_{push} = \sum_{i=1}^{N} a_i \cdot R_i(R0_i, MR0_i, H_{si}, +\alpha_{si}) + \frac{1}{\sum_{i=1}^{N} \frac{a_i}{R_i(R0_i, MR0_i, H_{si}, +\alpha_{si})}} \qquad (19)$$

-continued $$R_{pull} = \sum_{i=1}^{N} a_i \cdot R_i(R0_i, MR0_i, H_{si}, -\alpha_{si}) + \cfrac{1}{\sum_{i=1}^{N} \cfrac{a_i}{R_i(R0_i, MR0_i, H_{si}, -\alpha_{si})}} \quad (20)$$

B3, when the N types of magnetoresistive sensing units are connected in parallel, the resistance $R_{push}$ of the push arms and the resistance $R_{pull}$ of the pull arms can be expressed as:

$$\frac{1}{R_{push}} = \sum_{i=1}^{N} \frac{a_i}{R_i(R0_i, MR0_i, H_{si}, +\alpha_{si})} \quad (21)$$

$$\frac{1}{R_{pull}} = \sum_{i=1}^{N} \frac{a_i}{R_i(R0_i, MR0_i, H_{si}, -\alpha_{si})} \quad (22)$$

In addition, the bridge arm resistance R is not only the function of the direction angle of the pinned layer magnetic moment and the saturation magnetic field of the free layer of the magnetoresistive sensing unit, but also the function of the magnetoresistance change rate and the zero magnetic field resistance R0, namely, $$\frac{1}{R_{push}} = \frac{a_1}{R(R0_1, MR0_1, H_{s1}, +\alpha_{s1})} + \frac{a_2}{R(R0_2, MR0_2, H_{s2}, -\alpha_{s2})}$$

$$\frac{1}{R_{pull}} = \frac{a_1}{R(R0_1, MR0_1, H_{s1}, -\alpha_{s1})} + \frac{a_2}{R(R0_2, MR0_2, H_{s2}, -\alpha_{s2})}$$

$$S(H1) = \frac{R_{push}(Hi) - R_{pull}(Hi)}{R_{push}(Hi) + R_{pull}(Hi)}$$

Table 1 lists the key characteristic parameters of a N=2 parallel multiple push-pull magnetoresistive sensor corresponding to condition B3, wherein the key characteristic parameters of the push magnetoresistive sensing units respectively are:

[($R0_1$=500e3,$MR0_1$=200,$H_{s1}$=15.30,$\pm\alpha_{p1}$=116.2°),
    $a_1$=0.9824],

[($R0_2$=500e3,$MR0_2$=200,$H_{s2}$=9.61,$\pm\alpha_{p2}$=115.4°),
    $a_2$=0.0176]; and the key characteristic parameters of the pull magnetoresistive sensing units respectively are:

[($R0_1$=500e3,$MR0_1$=200,$H_{s1}$=15.30,$\pm\alpha_{p1}$=116.2°),
    $a_1$=0.9824],

[($R0_2$=500e3,$MR0_2$=200,$H_{s2}$=9.61,$-\alpha_{p2}$=115.4°),
    $a_2$=0.0176].

Through calculation, the linear range of the magnetic field is [−10.4, +10.4] Oe, and the gain factor of the magnetic field is Q=10.4/8.5=1.22. Obviously, the linear range shown in B3 is improved relative to the standard push-pull linear magnetoresistive sensor.

Based on the multiple push-pull magnetoresistive sensor shown in FIG. 8, optionally, the N types of push magnetoresistive sensing units that constitute the push arms are connected in parallel, and the N types of pull magnetoresistive sensing units that constitute the pull arms are connected in parallel. The resistance $R_{push}$ of the push arms, the resistance $R_{pull}$ of the pull arms, and the resistance $R_i$ of the multiple push-pull magnetoresistive sensing bridge arms meet the following relationships:

$$\frac{1}{R_{push}} = \sum_{i=1}^{N} \frac{a_i}{R_i(R0_i, MR_i, H_{si}, +\alpha_{pi})},$$

$$\frac{1}{R_{pull}} = \sum_{i=1}^{N} \frac{a_i}{R_i(R0_i, MR_i, H_{si}, -\alpha_{pi})},$$

wherein $R_i(R0_i, MR_i, H_{si}, \pm\alpha_{pi})$ characterizes a resistance value corresponding to four key characteristic parameters of the push magnetoresistive sensing unit, and $R_i(R0_i, MR_i, H_{si}, -\alpha_{pi})$ characterizes a resistance value corresponding to four key characteristic parameters of the pull magnetoresistive sensing unit.

Figure 9:
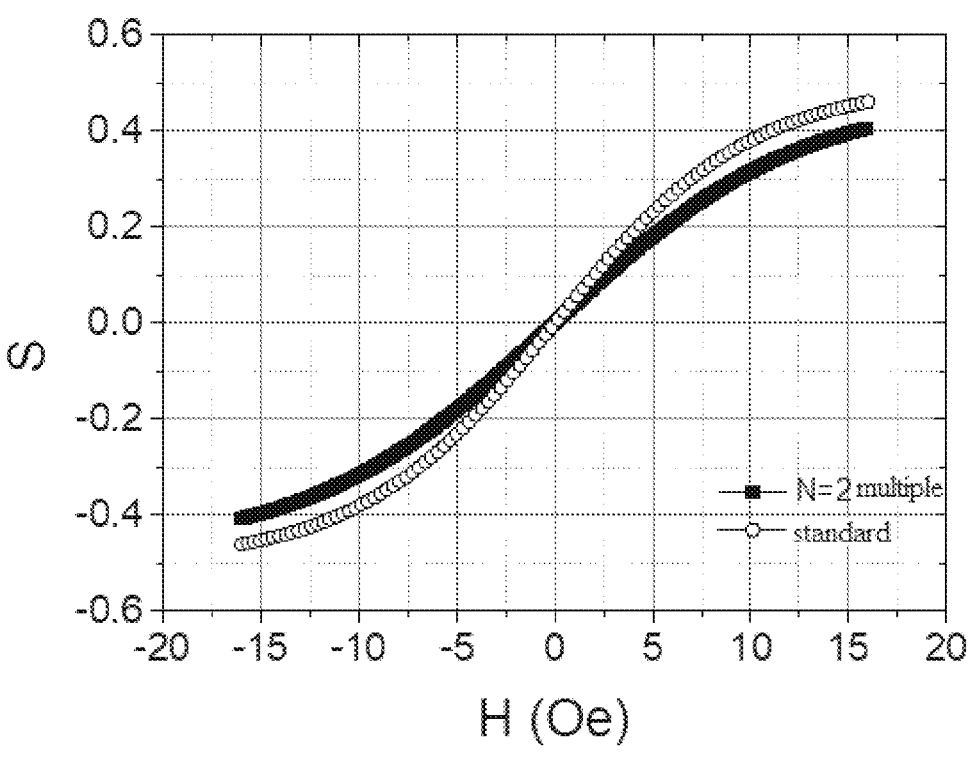
FIG. 9 is a relationship curve diagram of sensitivities of standard and multiple push-pull linear magnetoresistive sensors changing along with an external magnetic field.

Referring to FIG. 9, the sensitivity SvsH relationship curves of the standard push-pull linear magnetoresistive sensor and the N=2 parallel multiple push-pull magnetoresistive sensor within a wider magnetic field range [−16, +16] Oe are shown. It can be seen that the sensitivity SvsH relationship curve of the standard push-pull linear magnetoresistive sensor and the sensitivity SvsH relationship curve of the N=2 parallel multiple push-pull magnetoresistive sensor will be superimposed in a middle part where H is close to 0, and have larger differences at two ends.

Figure 10:
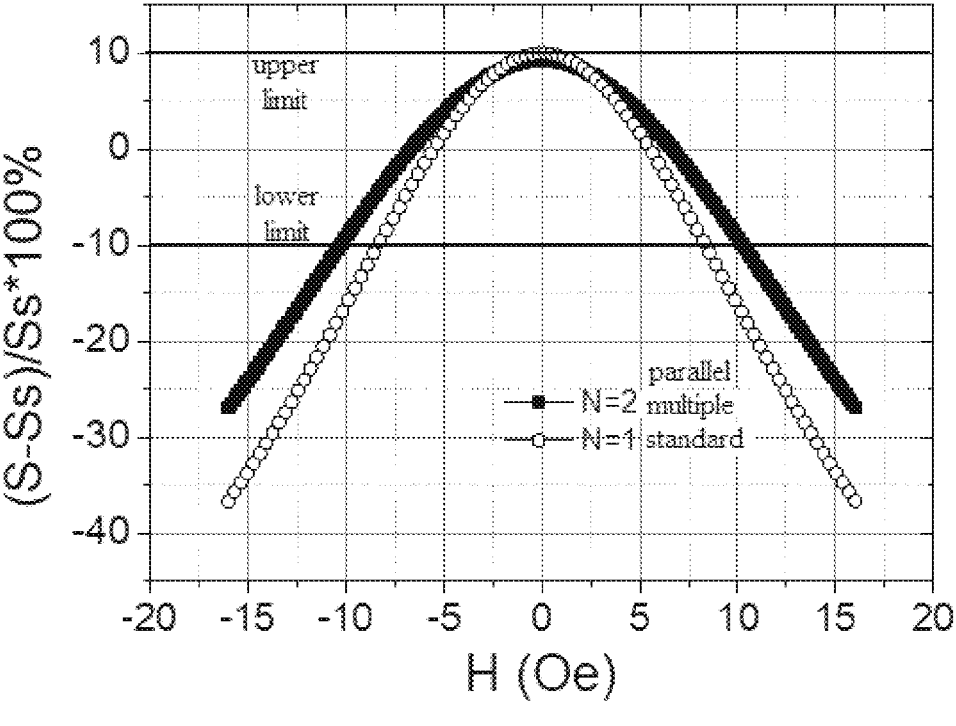
FIG. 10 is a relationship curve diagram of a sensitivity difference between standard and multiple push-pull linear magnetoresistive sensors changing along with an external magnetic field.

FIG. 10 is a relative error (S-a*H)/a*H*100% vs H curve that compares curve sensitivity with a fitted straight line. It can be seen that the curve of the standard push-pull linear magnetoresistive sensor and the curve of the N=2 parallel multiple push-pull magnetoresistive sensor are within upper and lower limit ranges of plus or minus 10%. The curve of the N=2 parallel multiple push-pull magnetoresistive sensor has a larger linear magnetic field range.

Based on the multiple push-pull magnetoresistive sensor shown in FIG. 8, optionally, the N types of push magnetoresistive sensing units that constitute the push arms are connected in series, and the N types of pull magnetoresistive sensing units that constitute the pull arms are connected in series.

The resistance $R_{push}$ of the push arms, the resistance $R_{pull}$ of the pull arms, and the resistance $R_i$ of the multiple push-pull magnetoresistive sensing bridge arms meet the following relationships:

$$R_{push} = \sum_{i=1}^{N} a_j \cdot R_i(R0_i, MR_i, H_{si}, +\alpha_{pi}),$$

$$R_{pull} = \sum_{i=1}^{N} a_j \cdot R_i(R0_i, MR_i, H_{si}, -\alpha_{pi}),$$

wherein $R_i(R0_i, MR_i, H_{si}, +\alpha_{pi})$ characterizes a resistance value corresponding to four key characteristic parameters of the push magnetoresistive sensing unit, and $R_i(R0_i, MR_i, H_{si}, -\alpha_{pi})$ characterizes a resistance value corresponding to four key characteristic parameters of the pull magnetoresistive sensing unit.

Table 2 lists curve values of the key characteristic parameters Hs, $\alpha_p$, sensitivity S=V/Vcc, and sensitivity difference S-Ss of the standard push-pull linear magnetoresistive sensor and the N=2 multiple push-pull magnetoresistive sensors shown in FIG. 8 changing along with the external magnetic field H, wherein N types of magnetoresistive sensing units of the push arms and the pull arms of the N=2 multiple push-pull magnetoresistive sensor are all connected in parallel or series. The unit of each parameter in Table 2 is not shown.

|  |  | push | | pull | | sensitivity | error | MR |
|---|---|---|---|---|---|---|---|---|
| standard | ±α_{ps} | 90 | | −90 | | 0.049993 | −0.00505 | 200 |
|  | H_{ss} | 10 | | 10 | |  |  |  |
|  |  | push1 | push2 | pull1 | pull2 |  |  |  |
| serial | ±α_{pi} | 90 | 90 | −90 | −90 | 0.054993 | −0.00701 | 200 |
|  | H_{si} | 5 | 50 | 5 | 50 |  |  |  |
|  |  | push1 | push2 | pull1 | pull2 |  |  |  |
| parallel | ±α_{pi} | 90 | 180 | −90 | −180 | 0.049456 | 2.81E−05 | 200 |
|  | H_{si} | 3.37 | 4.45 | 3.37 | 4.45 |  |  |  |

Table 2 provides the key characteristic parameters of one set of the N=2 parallel multiple push-pull magnetoresistive sensor and the standard push-pull linear magnetoresistive sensor, wherein in the N=2 parallel multiple push-pull magnetoresistive sensors, the key characteristic parameters of the push magnetoresistive sensing units respectively are:

$$[(R0_1=500e3,MR0_1=200,H_{s1}=3.37,+\alpha_{p1}=90°),a_1=1],$$

$$[(R0_2=500e3,MR0_2=200,H_{s2}=4.45,+\alpha_p2=180°,a_2=1];$$
and the key parameters of the pull magnetoresistive sensing units respectively are:

$$[(R0_1=500e3,MR0_1=200,H_{s1}=3.37,-\alpha_{p1}=-90°,a_1=1],$$

$$[(R0_2=500e3,MR0_2=200,H_{s2}=4.45,-\alpha_p2=-180°),\\ a_2=1].$$

For comparison, Table 2 further lists the key characteristic parameters of a N=2 serial multiple push-pull magnetoresistive sensor, the key characteristic parameters of the push magnetoresistive sensing units respectively are:

$$[(R0_1=500e3,MR0_1=200,H_{s1}=5,\pm\alpha_{p1}=90°),a_1=1],$$

$$[(R0_2=500e3,MR0_2=200,H_{s2}=50,+\alpha_p2=90°),a_2=1];$$
and the key parameters of the pull magnetoresistive sensing units respectively are:

$$[(R0_1=500e3,MR0_1=200,H_{s1}=5,-\alpha_{p1}=-90°,a_1=1],$$

$$[(R0_2=500e3,MR0_2=200,H_{s2}=50,-\alpha_{p2}=-90°,a_2=1].$$

Figure 11:
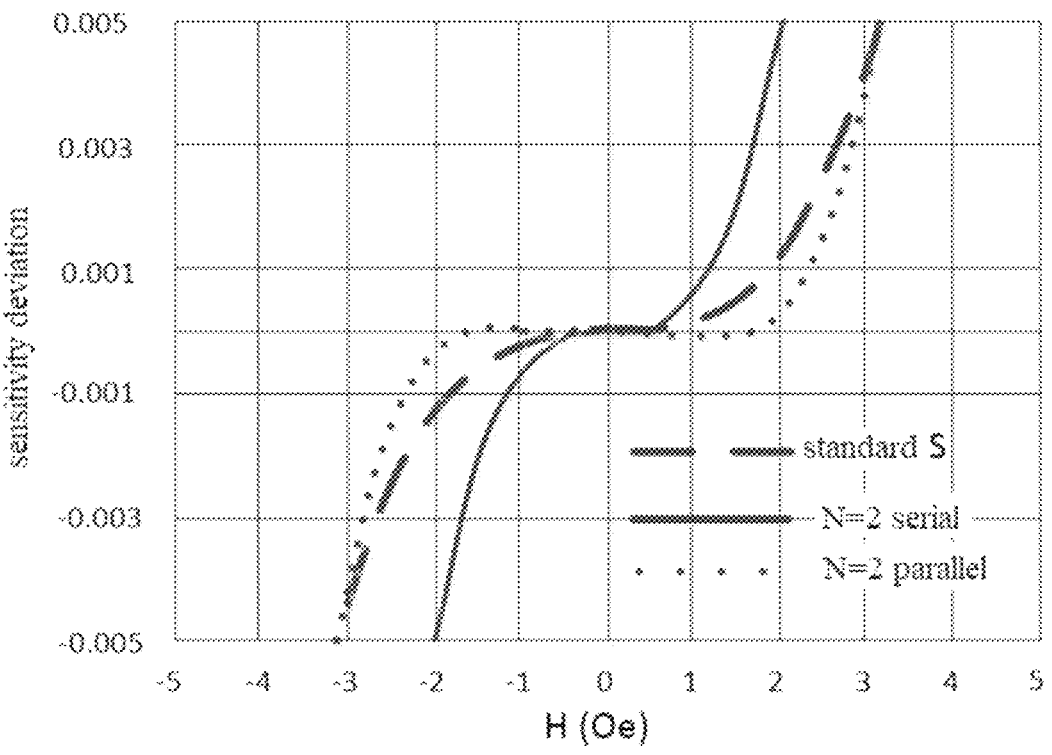
FIG. 11 is a relationship curve diagram of a sensitivity difference between standard and multiple push-pull linear magnetoresistive sensors changing along with an external magnetic field.

FIG. 11 shows sensitivity difference S-a*H vs H curves of standard, N=2 serial, and N=2 parallel push-pull magnetoresistive sensors. It can be seen that the difference curve of the N=2 parallel multiple push-pull magnetoresistive sensor shows a wider magnetic field range near the 0 value of the sensitivity difference.

Figure 12:
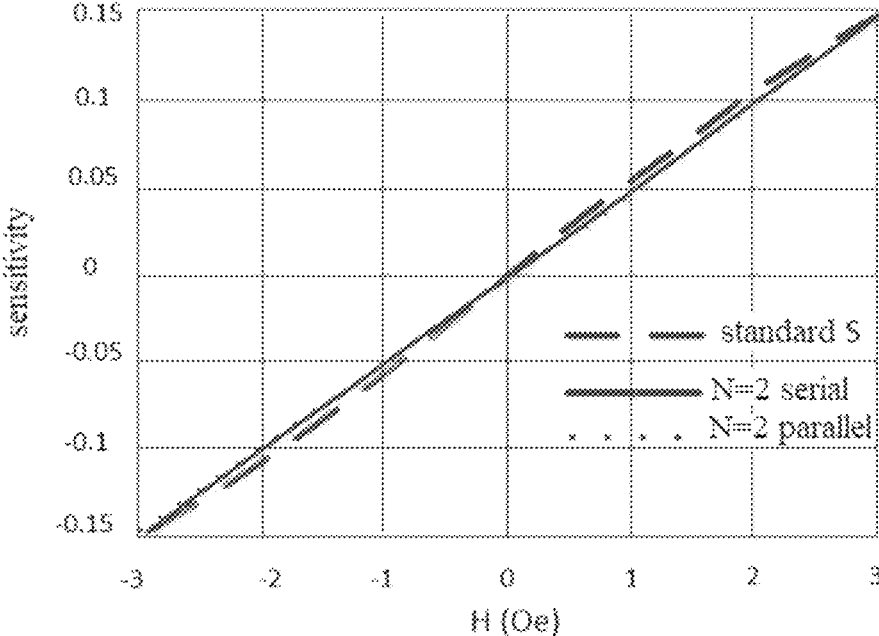
FIG. 12 is a relationship curve diagram of sensitivities of standard and multiple push-pull linear magnetoresistive sensors changing along with an external magnetic field.

FIG. 12 shows sensitivity S vs H curves of standard, N=2 serial, and N=2 parallel push-pull magnetoresistive sensors. It can be seen that in a small magnetic field range [−3, 3] Oe, the N=2 parallel and N=2 serial multiple push-pull magnetoresistive sensors have approximately the same curve. It can be seen from Table 2 that the sensitivity of the standard push-pull linear magnetoresistive sensor is S=0.049993, the sensitivity of the N=2 parallel multiple push-pull magnetoresistive sensors is 0.049456, and the sensitivity of the N=2 serial multiple push-pull magnetoresistive sensors is 0.054993. For an error value S-a*H, the error value S-a*H of the standard push-pull linear magnetoresistive sensor is −0.00505, the error value S-a*H of the N=2 parallel multiple push-pull magnetoresistive sensor is 2.81 E-05, and the error value S-a*H of the N=2 serial multiple push-pull magnetoresistive sensor is −0.00701. Therefore, in the small magnetic field range, the error of the parallel multiple push-pull magnetoresistive sensor is smaller, which is also consistent with the result in FIG. 10.

On this basis, further optionally, the N types of push magnetoresistive sensing units that constitute the push arms are connected in a hybrid series-parallel manner, and the N types of pull magnetoresistive sensing units that constitute the pull arms are connected in a hybrid series-parallel manner.

The resistance $R_{push}$ of the push arms, the resistance $R_{pull}$ of the pull arms, and the resistance $R_i$ of the multiple push-pull magnetoresistive sensing bridge arms meet the following relationships:

$$R_{push} = \sum_{i=1}^{N} a_i \cdot R_i(R0_i, MR_i, H_{si}, +\alpha_{pi}) + \cfrac{1}{\sum\limits_{i=s+1}^{N} \cfrac{a_i}{R_i(R0_i, MR_i, H_{si}, +\alpha_{pi})}},$$

$$R_{pull} = \sum_{i=1}^{N} a_i \cdot R_i(R0_i, MR_i, H_{si}, +\alpha_{pi}) + \cfrac{1}{\sum\limits_{i=s+1}^{N} \cfrac{a_i}{R_i(R0_i, MR_i, H_{si}, -\alpha_{pi})}},$$

wherein $R_i(R0_i, MR_i, H_{si}, \pm\alpha_{pi})$ characterizes a resistance value corresponding to four key characteristic parameters of the push magnetoresistive sensing unit, and $R_i(R0_i, MR_i, H_{si}, -\alpha_{pi})$ characterizes a resistance value corresponding to four key characteristic parameters of the pull magnetoresistive sensing unit, m being an integer greater than or equal to 1 and less than or equal to N. The multiple push-pull magnetoresistive sensor adopting a hybrid series-parallel connection manner can obtain the required linear magnetic field range.

Exemplarily, optionally, the magnetoresistive sensor further includes: a magnetoresistive shunt resistor $R_{sh}$ positioned on the substrate, the magnetoresistive shunt resistor $R_{sh}$ being connected to the multiple push-pull magnetoresistive sensing bridge arms, and the key characteristic parameters of the magnetoresistive shunt resistor $R_{sh}$ being $[(R0_{sh}, MR_{sh}, H_{ssh}, \alpha_{psh}), a_{sh}]$. There is at least one set of key characteristic parameters $\{[(R0_{sh}, MR_{sh}, H_{ssh}, \alpha_{psh}), a_{sh}]$ and $[(R0_i, MR_i, H_{si}, \pm\alpha_{pi}), a_i]\}$, so that the R-H characteristic parameters of the magnetoresistive shunt resistor $R_{sh}$ are superimposed with the R-H characteristic parameters of the push magnetoresistive sensing units and the pull magnetoresistive sensing units of the multiple push-pull magnetoresistive sensing bridge arms.

In the multiple push-pull magnetoresistive sensor provided by the embodiment, a magnetoresistive shunt resistor $R_{shunt}$ is introduced, so that the magnetoresistive shunt resistor $R_{shunt}$ is connected in series with the multiple push-pull magnetoresistive sensing bridge arms, and the multiple push-pull magnetoresistive sensor with the higher linear range of the magnetic field can be obtained through the changing curve of $R_{shunt}$ along with the magnetic field. Specifically, the R-H characteristic parameters of the magnetoresistive shunt resistor $R_{sh}$ of the magnetoresistive sensing unit are superimposed with the R-H characteristic parameters of the push magnetoresistive sensing units and the pull magnetoresistive sensing units in the multiple push-pull magnetoresistive sensing bridge arms, so that the linear range of the multiple push-pull magnetoresistive sensing bridge arms including the magnetoresistive shunt resistor is greater than the linear range of the standard push-pull linear magnetoresistive sensor.

Figure 13:
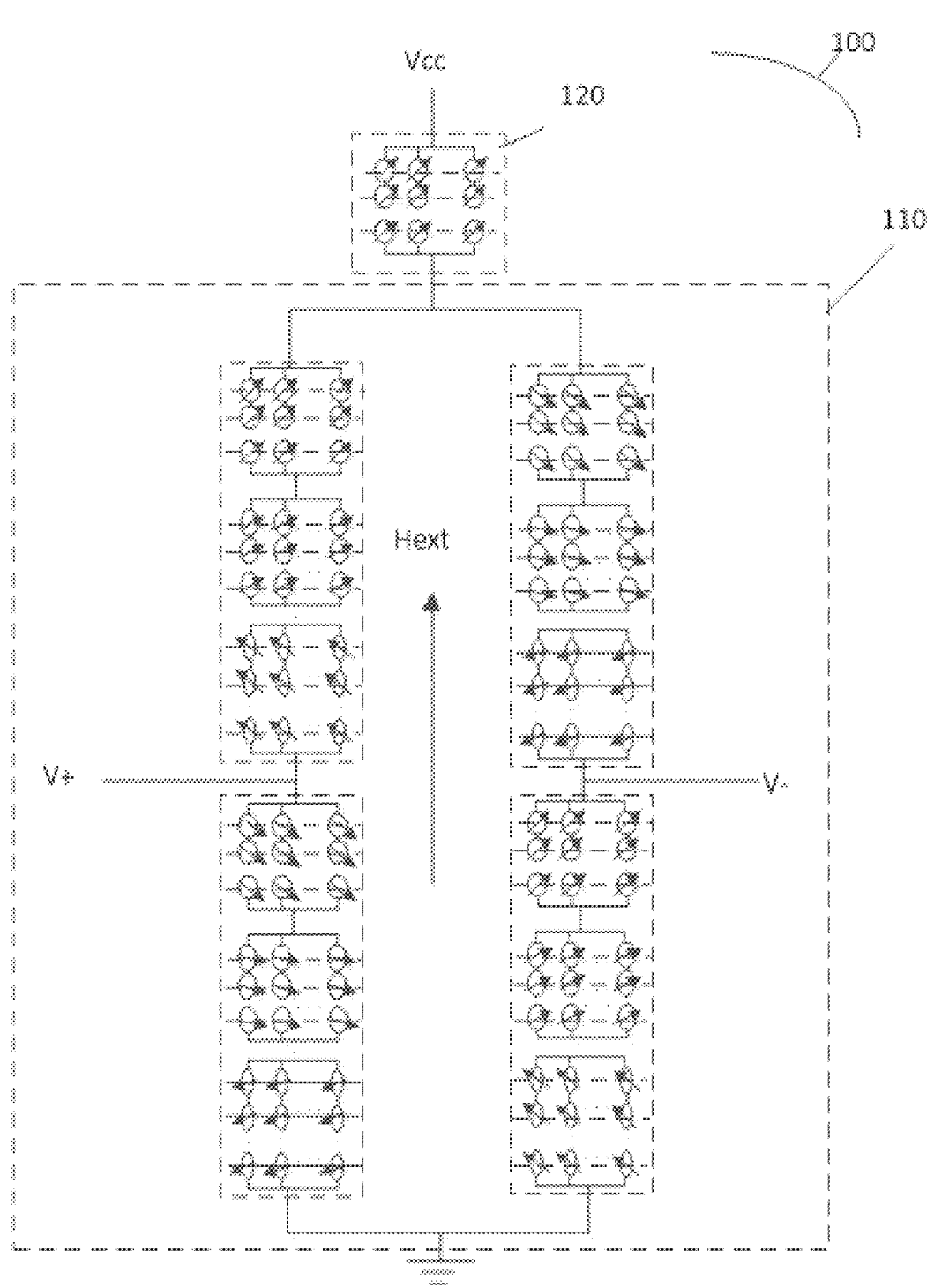
FIG. 13 is an electrical connection diagram of a multiple push-pull linear magnetoresistive sensor with a shunt resistor.

FIG. 13 is an electrical connection diagram of a multiple push-pull magnetoresistive sensor 100 with a magnetoresistive shunt resistor $R_{shunt}$. The multiple push-pull magnetoresistive sensor 100 includes a linear push-pull magnetoresistive sensing bridge 110, wherein the linear push-pull magnetoresistive sensing bridge 110 may be a standard or multiple push-pull magnetoresistive sensing bridge arms, wherein the key characteristic parameters of the magnetoresistive sensing unit are [$(R0_i, MR_i, H_{si}, \pm\alpha_{pi})$, $a_i$], wherein i=1:N. The multiple push-pull magnetoresistive sensor 100 further includes a magnetoresistive shunt resistor $R_{shunt}$ 120 connected to the linear push-pull magnetoresistive sensing bridge 110, the key characteristic parameters of the magnetoresistive shunt resistor $R_{shunt}$ 120 being [$(R0_{sh}, MR_{sh}, H_{ssh}, \alpha_{psh})$, $a_{sh}$], and the coefficient ash indicating that $R_{shunt}$ can characterize series, parallel, or series-parallel connection manners between $R0_{sh}$.

So, the sensitivity of the multiple push-pull linear magnetoresistive sensor 100 can be expressed as:

$$S(Hi) = \frac{R_{push}(Hi) - R_{pull}(Hi)}{R_{push}(Hi) + R_{pull}(Hi) + 2 \cdot R_{start}(H_i)}$$

Figure 14:
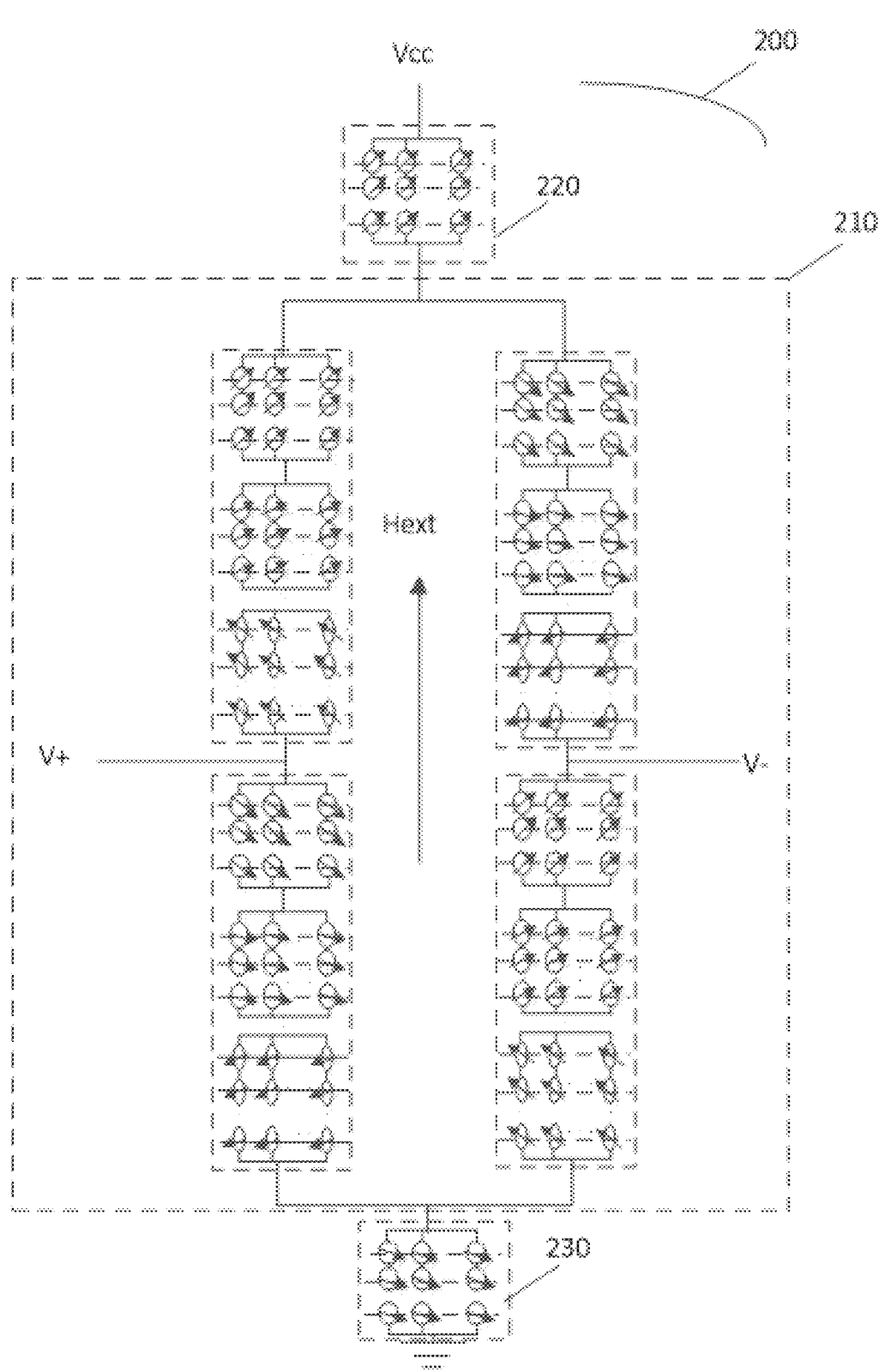
FIG. 14 is an electrical connection diagram of a multiple push-pull linear magnetoresistive sensor with a shunt resistor.

FIG. 14 is an electrical connection diagram of a multiple push-pull magnetoresistive sensor 200 with a magnetoresistive shunt resistor $R_{shunt}$. The multiple push-pull magnetoresistive sensor 200 includes a linear push-pull magnetoresistive sensing bridge 210, wherein the linear push-pull magnetoresistive sensing bridge 210 may be a standard or multiple push-pull magnetoresistive sensing bridge arms, and key characteristic parameters of the magnetoresistive sensing unit are [$(R0_i, MR_i, H_{si}, \pm\alpha_{pi})$, $a_i$]. The multiple push-pull magnetoresistive sensor 200 further includes a push shunt resistor $R_{shunt}$ 220 connected to the linear push-pull magnetoresistive sensing bridge 210, the key characteristic parameters of the push shunt resistor $R_{shunt}$ 220 being [$(R0_{sh}, MR_{sh}, H_{ssh}, \pm\alpha_{psh})$, $a_{sh}$], and further includes a pull shunt resistor $R_{shunt}$ 230, the key characteristic parameters of the pull shunt resistor $R_{shunt}$ 230 being [$(R0_{sh}, MR_{sh}, H_{ssh}, -\alpha_{psh})$, $a_{sh}$].

So, the sensitivity of the multiple push-pull linear magnetoresistive sensor 200 can be expressed as:

$$S(Hi) = \frac{R_{push}(Hi) - R_{pull}(Hi)}{R_{push}(Hi) + R_{pull}(Hi) + 2 \cdot (R_{start}(H_i) + R_{start}(H_i))},$$

Table 3 compares the key parameters of the multiple push-pull linear magnetoresistive sensor with the magnetoresistive shunt resistor and the standard push-pull linear magnetoresistive sensor.

16

| | | push | pull |
|---|---|---|---|
| standard | $\pm\alpha_{ps}$ | 90 | -90 |
| | $H_{ss}$ | 10 | 10 |
| | R0s | 10000 | 10000 |
| | MRs | 200 | 200 |

| | | push1 | pull1 |
|---|---|---|---|
| Shunt push-pull bridge | $\pm\alpha_{pi}$ | 90 | -90 |
| | $H_{si}$ | 7.9 | 7.9 |
| | R0i | 8000 | 8000 |

| | |
|---|---|
| Rshunt | 2000 |
| Hsshunt | 10 |
| $a_{pshunt}$ | 180 |
| MR | 200 |

For a standard push-pull linear magnetoresistive sensor, the key parameters of the standard push magnetoresistive sensing unit and the standard pull magnetoresistive sensing unit thereof respectively are:

$[(R_0=10e3, MR=200, Hs=10, +\alpha_p=+90), a1=1]$, $[(R_0=10e3, MR=200, Hs=10, -\alpha_p=-90), a1=1]$, wherein there are a magnetoresistive shunt resistor $R_{shunt}$, the key characteristic parameters of the magnetoresistive shunt resistor being:

$[(R0_{sh}=2e3, MR_{sh}=200, H_{ssh}=10, anglePLsh=180), a_1=1]$, and a N=1 push-pull linear magnetoresistive sensor connected thereto, the key parameters of the push magnetoresistive sensing unit and the pull magnetoresistive sensing unit of the N=1 push-pull linear magnetoresistive sensor respectively being:

$[(R0=8e3, MR=200, Hs=7.9, +\alpha_p=+90), a_1=1]$, $[(R0=8e3, MR=200, Hs=7.9, -\alpha_p=-90), a_1=1]$.

Figure 15:
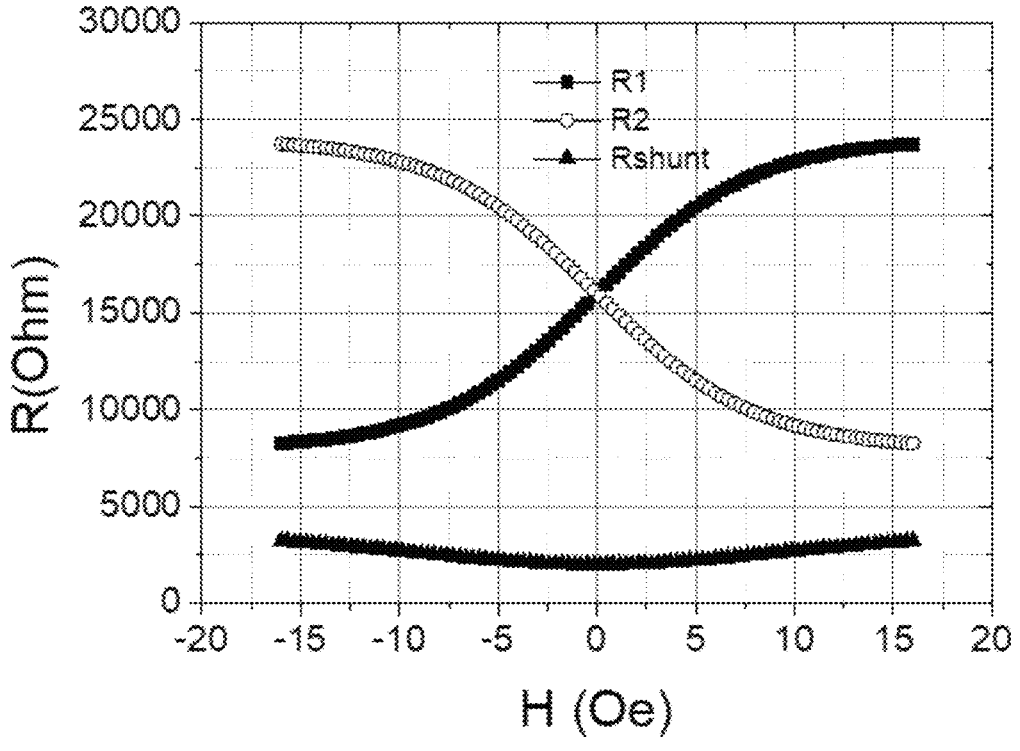
FIG. 15 is a relationship curve diagram of the resistance of magnetoresistive sensing units of a multiple push-pull linear magnetoresistive sensor with a shunt resistor changing along with an external magnetic field.

FIG. 15 shows magnetic field characteristic curves of the push magnetoresistive sensing unit, the pull magnetoresistive sensing unit, and the magnetoresistive shunt resistor. It can be seen that the magnetoresistive shunt resistor has a symmetrical curve characteristic, which is respectively complementary to the push magnetoresistive sensing unit and the pull magnetoresistive sensing unit.

Figure 16:
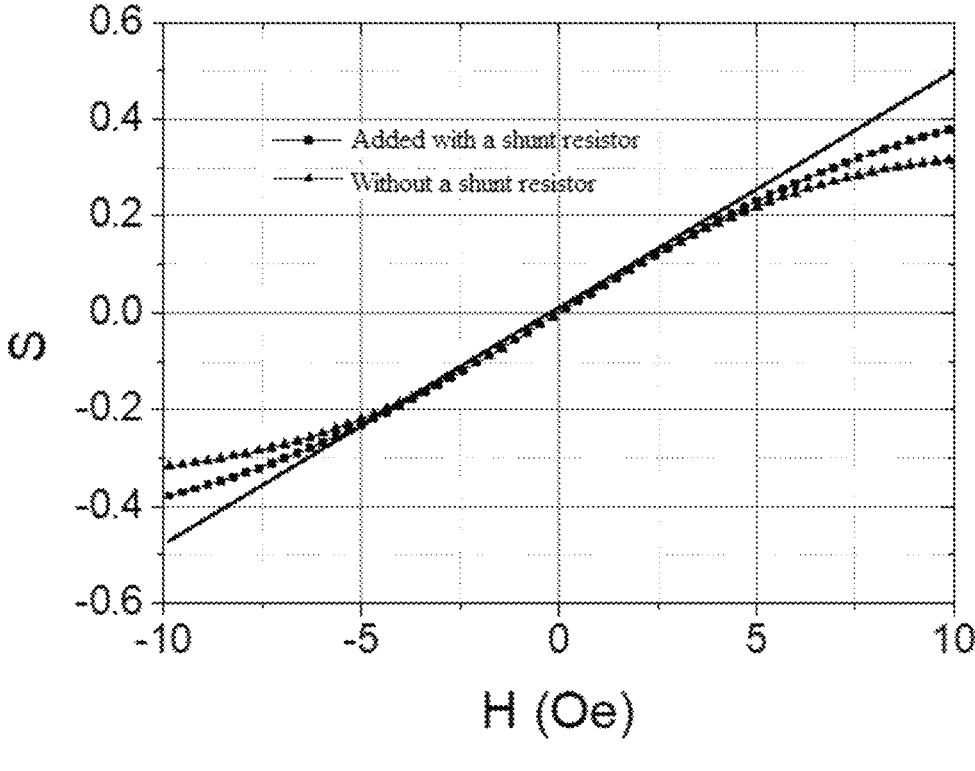
FIG. 16 is a relationship curve diagram of sensitivities of a standard push-pull linear magnetoresistive sensor and a multiple push-pull linear magnetoresistive sensor with a shunt resistor changing along with an external magnetic field.

FIG. 16 shows sensitivity S vs external magnetic field H curve characteristics of the standard push-pull linear magnetoresistive sensor and the multiple push-pull linear magnetoresistive sensor with the shunt resistor. It can be seen that relative to the standard push-pull linear magnetoresistive sensors, the multiple push-pull linear magnetoresistive sensor with the shunt resistor has the wider linear range.

It should be noted that the above are only preferred embodiments of the present disclosure and applied technical principles. Those skilled in the art will understand that the present disclosure is not limited to the specific embodiments described herein, and various obvious changes, readjustments, mutual combinations, and substitutions can be made by those skilled in the art without departing from the scope of the present disclosure. Therefore, although the present disclosure has been described in detail through the above embodiments, the present disclosure is not limited to the above embodiments, and can also include other equivalent embodiments without departing from the concept of the present disclosure. The scope of the present disclosure is determined by the scope of the appended claims.

The invention claimed is:

1. A magnetoresistive sensor with harmonically broadened linear range, comprising:

a substrate; and a multiple push-pull magnetoresistive sensing bridge arms positioned on the substrate, the multiple push-pull magnetoresistive sensing bridge arms comprising push arms and pull arms, the push arms comprising N types of push magnetoresistive sensing units, the pull arms comprising N types of pull magnetoresistive sensing units, and N being an integer greater than 1; wherein key characteristic parameters of each magnetoresistive sensing unit comprises a zero magnetic field resistance $R0_i$, a magnetoresistance change rate $MR_i$, a free layer saturation magnetic field $H_{si}$, a direction angle $\pm\alpha_{pi}$ of pinned layer magnetic moment, and a series-parallel coefficient $a_i$, wherein the push magnetoresistive sensing unit has the direction angle $+\alpha_{pi}$ of the pinned layer magnetic moment, and the pull magnetoresistive sensing unit has the direction angle $-\alpha_{pi}$ of the pinned layer magnetic moment, i being an integer from 1 to N;

the key characteristic parameters of the push magnetoresistive sensing units and corresponding pull magnetoresistive sensing units are different from the key characteristic parameters of standard magnetoresistive sensing unit of a standard push-pull linear magnetoresistive sensor;

there is at least one set of key characteristic parameters $[(R0_j, MR_j, H_{sj}, \pm\alpha_{pj}), a_j]$, j being an integer greater than or equal to 1 and less than or equal to N;

linear parts and nonlinear harmonic parts of R-H characteristic parameters that characterize the push magnetoresistive sensing units and the corresponding pull magnetoresistive sensing units are superimposed, so that the linear range of the multiple push-push magnetoresistive sensing bridge is greater than the linear range of the standard push-pull linear magnetoresistive sensor, wherein the key characteristic parameters of the standard magnetoresistive sensing unit are $[(R0_s, MR_s, H_{ss}, \pm_{ps}), a_s], \pm\alpha_{ps}=90°, a_s=1$.

2. The magnetoresistive sensor according to claim 1, wherein the N types of push magnetoresistive sensing units that constitute the push arms are connected in parallel, and the N types of pull magnetoresistive sensing units that constitute the pull arms are connected in parallel;

the resistance $R_{push}$ of the push arm, the resistance $R_{pull}$ of the pull arm, and the resistance $R_i$ of the multiple push-pull magnetoresistive sensing bridge arms meet the following relationships:

$$\frac{1}{R_{push}} = \sum_{i=1}^{N} \frac{a_i}{R_i(R0_i, MR_i, H_{si}, +\alpha_{pi})},$$

$$\frac{1}{R_{pull}} = \sum_{i=1}^{N} \frac{a_i}{R_i(R0_i, MR_i, H_{si}, -\alpha_{pi})},$$

wherein $R_i(R0_i, MR_i, H_{si}, \pm\alpha_{pi})$ characterizes a resistance value corresponding to four key characteristic parameters of the push magnetoresistive sensing unit, and $R_i(R0_i, MR_i, H_{si}, -\alpha_{pi})$ characterizes a resistance value corresponding to four key characteristic parameters of the pull magnetoresistive sensing unit.

3. The magnetoresistive sensor according to claim 1, wherein the N types of push magnetoresistive sensing units that constitute the push arms are connected in series, and the N types of pull magnetoresistive sensing units that constitute the pull arms are connected in series;

the resistance $R_{push}$ of the push arm, the resistance $R_{pull}$ of the pull arm, and the resistance $R_i$ of the multiple push-pull magnetoresistive sensing bridge arms meet the following relationships:

$$R_{push} = \sum_{i=1}^{N} a_i \cdot R_i(R0_i, MR_i, H_{si}, +\alpha_{pi}),$$

$$R_{pull} = \sum_{i=1}^{N} a_i \cdot R_i(R0_i, MR_i, H_{si}, -\alpha_{pi}),$$

wherein $R_i(R0_i, MR_i, H_{si}, +\alpha_{pi})$ characterizes a resistance value corresponding to four key characteristic parameters of the push magnetoresistive sensing unit, and $R_i(R0_i, MR_i, H_{si}, -\alpha_{pi})$ characterizes a resistance value corresponding to four key characteristic parameters of the pull magnetoresistive sensing unit.

4. The magnetoresistive sensor according to claim 1, wherein the N types of push magnetoresistive sensing units that constitute the push arms are connected in a hybrid series-parallel manner, and the N types of pull magnetoresistive sensing units that constitute the pull arms are connected in a hybrid series-parallel manner;

the resistance $R_{push}$ of the push arm, the resistance $R_{pull}$ of the pull arm, and the resistance $R_i$ of the multiple push-pull magnetoresistive sensing bridge arms meet the following relationships:

$$R_{push} = \sum_{i=1}^{N} a_i \cdot R_i(R0_i, MR_i, H_{si}, +\alpha_{pi}) + \frac{1}{\sum_{i=s+1}^{N} \frac{a_i}{R_i(R0_i, MR_i, H_{si}, +\alpha_{pi})}},$$

$$R_{pull} = \sum_{i=1}^{N} a_i \cdot R_i(R0_i, MR_i, H_{si}, -\alpha_{pi}) + \frac{1}{\sum_{i=s+1}^{N} \frac{a_i}{R_i(R0_i, MR_i, H_{si}, -\alpha_{pi})}},$$

wherein $R_i(R0_i, MR_i, H_{si}, +\alpha_{pi})$ characterizes a resistance value corresponding to four key characteristic parameters of the push magnetoresistive sensing unit, and $R_i(R0_i, MR_i, H_{si}, -\alpha_{pi})$ characterizes a resistance value corresponding to four key characteristic parameters of the pull magnetoresistive sensing unit, m being an integer greater than or equal to 1 and less than or equal to N.

5. The magnetoresistive sensor according to claim 1, further comprising a magnetoresistive shunt resistor $R_{sh}$ positioned on the substrate, wherein the magnetoresistive shunt resistor $R_{sh}$ is connected to the multiple push-pull magnetoresistive sensing bridge arms, the key characteristic parameters of the magnetoresistive shunt resistor $R_{sh}$ are $[(R0_{sh}, MR_{sh}, H_{ssh}, +\alpha_{psh}), a_{sh}]$;

there is at least one set of key characteristic parameters $\{[(R0_{sh}, MR_{sh}, H_{ssh}, \pm\alpha_{ps}h), a_{sh}]$ and $[(R0_i, MR_i, H_{si}, \pm\alpha_{pi}), a_i]\}$, so that the R-H characteristic parameters of the magnetoresistive shunt resistor $R_{sh}$ are superimposed with the R-H characteristic parameters of the push magnetoresistive sensing units and the pull magnetoresistive sensing units in the multiple push-pull magnetoresistive sensing bridge arms.

6. The magnetoresistive sensor according to claim 1, wherein the direction angle of the pinned layer magnetic moment of the magnetoresistive sensing unit of the multiple push-pull magnetoresistive sensing bridge arms has a value range of 0°-360°.

7. The magnetoresistive sensor according to claim 1, wherein the zero magnetic field resistance of the magnetoresistive sensing unit of the multiple push-pull magnetoresistive sensing bridge arms has a value range of 1 KΩ-1000 MΩ.

8. The magnetoresistive sensor according to claim 1, wherein the free layer saturation magnetic field of the magnetoresistive sensing unit of the multiple push-pull magnetoresistive sensing bridge arms has a value range of 1-100 Oe.

9. The magnetoresistive sensor according to claim 1, wherein the ratio of the linear range of the multiple push-pull magnetoresistive sensing bridge arms to the linear range of the standard push-pull linear magnetoresistive sensor is greater than 1 and less than or equal to 2.

\* \* \* \* \*